US010243989B1

(12) United States Patent
Ding et al.

(10) Patent No.: US 10,243,989 B1
(45) Date of Patent: Mar. 26, 2019

(54) SYSTEMS AND METHODS FOR INSPECTING EMAILS FOR MALICIOUS CONTENT

(71) Applicant: Trend Micro Incorporated, Tokyo (JP)

(72) Inventors: Zhichao Ding, Nanjing (CN); Jun Qu, Nanjing (CN); Guangxiang Yang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 15/661,638

(22) Filed: Jul. 27, 2017

(51) Int. Cl.
*G06F 21/00* (2013.01)
*H04L 29/06* (2006.01)
*H04L 12/58* (2006.01)

(52) U.S. Cl.
CPC .......... *H04L 63/1441* (2013.01); *H04L 51/12* (2013.01); *H04L 51/22* (2013.01); *H04L 51/24* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 7,657,935 B2 * | 2/2010 | Stolfo | .................... | H04L 51/12 726/22 |
| 8,239,944 B1 * | 8/2012 | Nachenberg | ........ | H04L 63/1416 713/150 |
| 8,495,737 B2 * | 7/2013 | Sinha | .................. | H04L 63/0227 726/22 |
| 8,819,816 B2 * | 8/2014 | Stein | ....................... | G06F 15/16 726/22 |
| 2005/0021740 A1 * | 1/2005 | Bar | ..................... | H04L 63/0236 709/224 |
| 2005/0192966 A1 * | 9/2005 | Hilbert | .............. | G06F 17/30067 |
| 2006/0230461 A1 * | 10/2006 | Hauser | ............... | H04L 63/0407 726/27 |
| 2006/0272017 A1 * | 11/2006 | Largman | ............. | G06F 11/1417 726/22 |
| 2009/0254970 A1 * | 10/2009 | Agarwal | ............... | G06F 21/554 726/1 |
| 2010/0077481 A1 * | 3/2010 | Polyakov | .............. | G06F 21/552 726/24 |
| 2011/0016530 A1 * | 1/2011 | Fossen | .................. | G06F 21/564 726/24 |

(Continued)

*Primary Examiner* — Maung T Lwin
(74) *Attorney, Agent, or Firm* — Okamoto & Benedicto LLP

(57) ABSTRACT

An email inspection system receives emails that are addressed to recipients of a private computer network. The emails are inspected for malicious content, and security information of emails that pass inspection is recorded. When an email is detected to have malicious content, the recorded security information of emails is checked to identify compromised emails, which are emails that previously passed inspection but include the same malicious content. A notification email is sent to recipients of compromised emails. The notification email includes Simple Mail Transfer Protocol headers that facilitate identification of the recipients, blocking of incoming emails with the same malicious content, and identification of public Mail Transfer Agents that send malicious emails, i.e., emails with malicious content.

14 Claims, 4 Drawing Sheets

(56) References Cited

U.S. PATENT DOCUMENTS

| | | | | |
|---|---|---|---|---|
| 2012/0167219 A1* | 6/2012 | Zaitsev | ................... | G06F 21/56 |
| | | | | 726/24 |
| 2013/0117809 A1* | 5/2013 | McDougal | .......... | H04L 63/1408 |
| | | | | 726/1 |
| 2013/0145483 A1* | 6/2013 | DiMuro | ................... | G06F 21/60 |
| | | | | 726/28 |
| 2014/0259168 A1* | 9/2014 | McNamee | ............ | G06F 21/566 |
| | | | | 726/23 |
| 2015/0372980 A1* | 12/2015 | Eyada | ................. | H04L 63/1441 |
| | | | | 726/1 |
| 2018/0324179 A1* | 11/2018 | Hou | .................... | H04L 63/0876 |

* cited by examiner

SYSTEMS AND METHODS FOR INSPECTING EMAILS FOR MALICIOUS CONTENT

BACKGROUND OF THE INVENTION

1. Field of the Invention

The present invention relates generally to computer security, and more particularly but not exclusively to systems and methods for inspecting emails.

2. Description of the Background Art

Emails may be inspected for malicious content. For example, a file that is attached to an email may be scanned for malicious code by pattern matching, evaluated in a sandbox, or compared to known malicious attachments (e.g., by hash comparison). As another example, a Uniform Resource Locator (URL) included in an email may be checked against a URL reputation database to determine whether or not the URL is known to be malicious, such as a URL of a phishing site, malicious command and control server, etc. Emails that pass the security inspection are forwarded to their recipients, whereas those that fail the security inspection are subjected to quarantine or other response action.

SUMMARY

In one embodiment, an email inspection system receives emails that are addressed to recipients of a private computer network. The emails are inspected for malicious content, and security information of emails that pass inspection is recorded. When an email is detected to have malicious content, the recorded security information of emails is checked to identify compromised emails, which are emails that previously passed inspection but include the same malicious content. A notification email is sent to recipients of compromised emails. The notification email includes Simple Mail Transfer Protocol headers that facilitate identification of the recipients, blocking of incoming emails with the same malicious content, and identification of public Mail Transfer Agents that send malicious emails, i.e., emails with malicious content.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
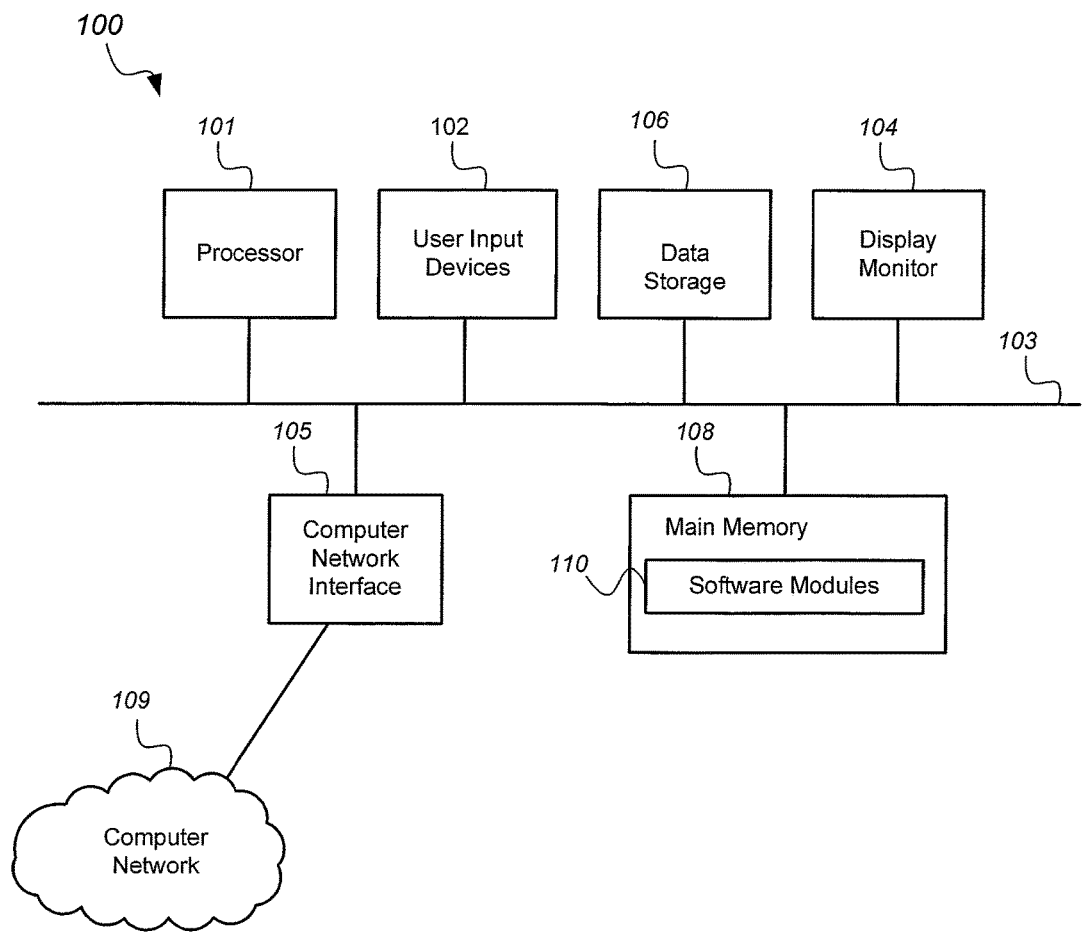
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as an email inspection system, or other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with one or more software modules 110, comprising instructions stored non-transitory in the main memory 108 for execution by the processor 101 to cause the computer 100 to perform corresponding programmed steps. An article of manufacture may be embodied as computer-readable storage medium including instructions that when executed by the processor 101 cause the computer 100 to be operable to perform the functions of the one or more software modules 110.

In one embodiment where the computer 100 is employed as an email inspection system, the software modules 110 may comprise instructions that when executed by the processor 101 cause the computer 100 to perform the steps of receiving and inspecting a first email for malicious content, recording security-related information of the email in a database when the first email passes inspection, subsequently receiving and inspecting a second email for malicious content, detecting that the second email has malicious content, querying the database to determine if the malicious content found in the second email is present in another email that previously passed inspection, identifying that the first email passed inspection and included the malicious content, and sending a notification email to alert the recipient of the first email. The notification email may indicate that the first email has malicious content. In one embodiment, the notification email includes SMTP notification headers for facilitating identification of the first email and other emails with the same malicious content and facilitating other security-related actions.

Figure 2:
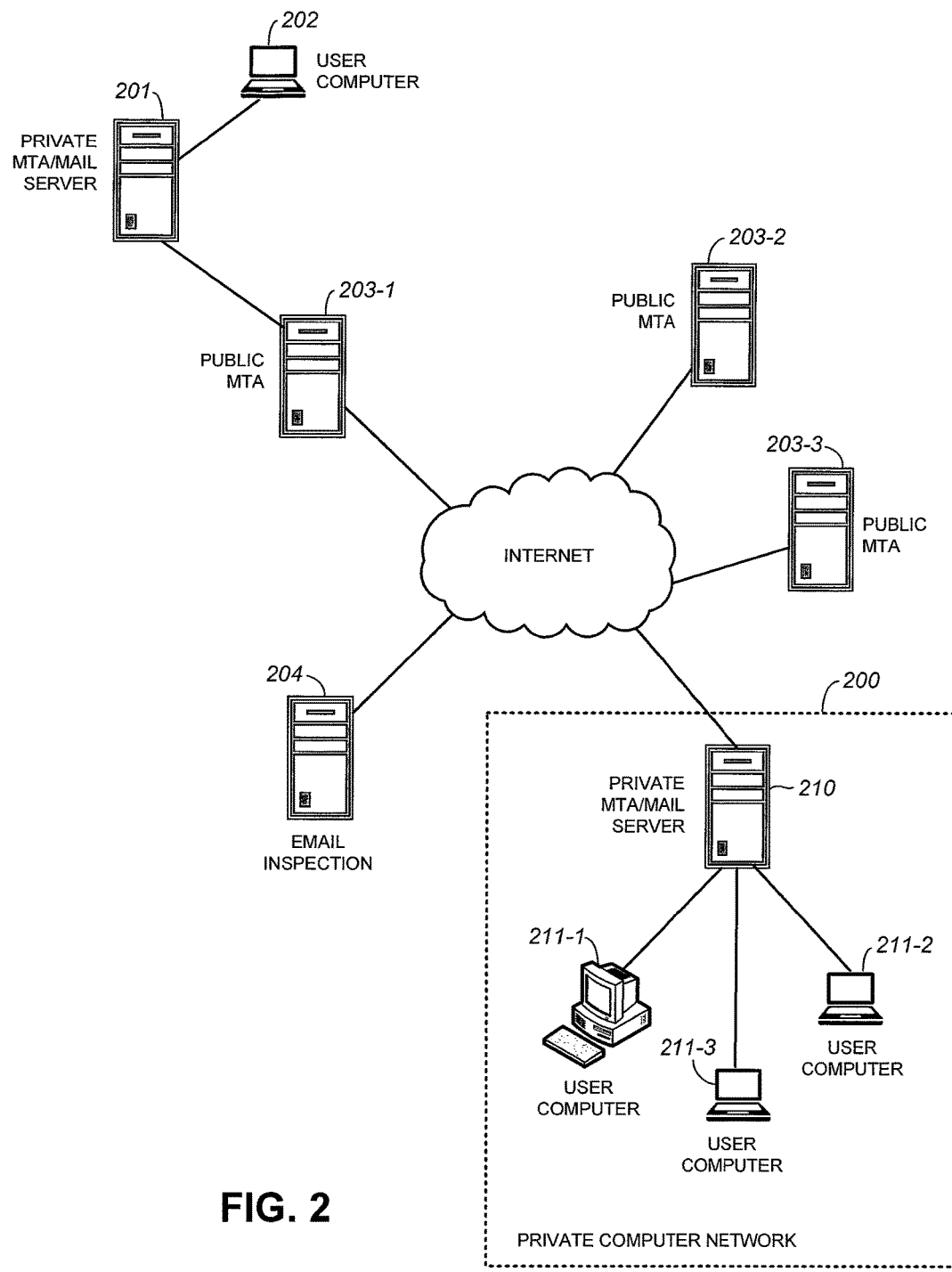
FIG. 2 shows an example arrangement of computers where email inspection may be performed in accordance with an embodiment of the present invention.

FIG. 2 shows an example arrangement of computers where email inspection may be performed in accordance with an embodiment of the present invention. In the example of FIG. 2, a private computer network 200 includes a private mail transfer agent (MTA) 210 and a plurality of user computers 211 (i.e., 211-1, 211-2, 211-3, . . . ). The private MTA 210 may comprise a server computer that provides MTA and mail server functionality for computers of the private computer network 200. The private MTA 210 may receive emails that are transmitted between public MTAs 203 (i.e., 203-1, 203-2, 203-3, . . . ) over the Internet. For example, a sender that employs a user computer 202 may send an email to a recipient that employs a user computer 211-3. The email may follow a path that includes the user computer 202, private MTA 201, one or more public MTAs 203, the private MTA 210, and the user computer 211-3. As its name implies, a public MTA is generally publicly available on the Internet for forwarding emails. In contrast, a private MTA belongs to a private computer network.

Figure 3:
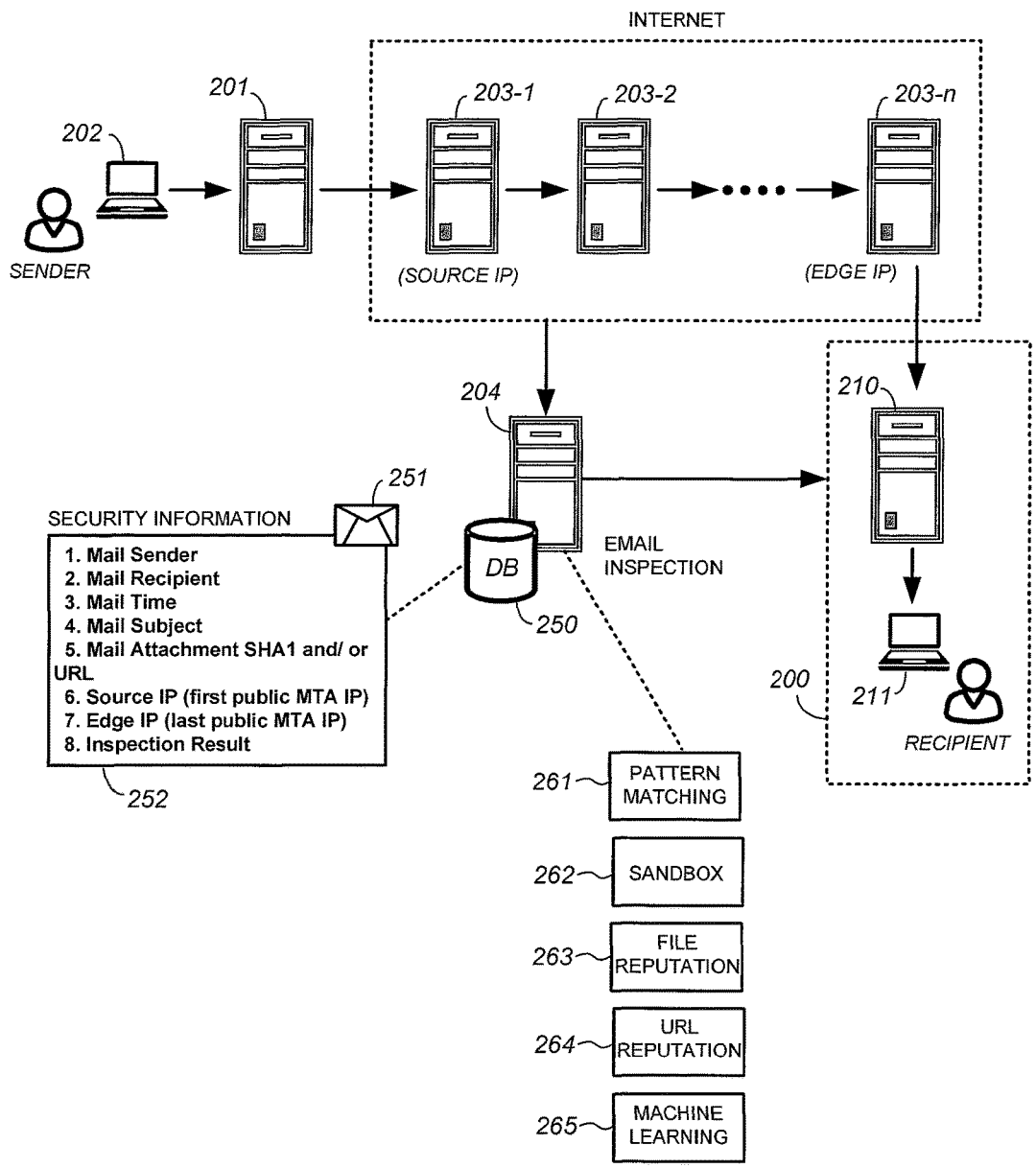
FIG. 3 shows a system for inspecting emails for malicious content in accordance with an embodiment of the present invention.

FIG. 3 shows a system for inspecting emails for malicious content in accordance with an embodiment of the present invention. In the example of FIG. 3, an email is sent by a sender from a computer 202 for reception by a recipient in a user computer 211 in accordance with the Simple Mail Transfer Protocol (SMTP). That is, the "from" field of the email indicates the sender's email address and the "to" field of the email indicates the recipient's email address. The private MTA 201 may provide MTA and mail server functionality. The email may be forwarded from the private MTA 201 to one or more public MTAs 203 on the Internet.

In the example of FIG. 3, the Internet protocol (IP) address of the public MTA 203-1 is also referred to as the "source IP address" because the public MTA 203-1 is the first public MTA that received the email from the private MTA 201. The email may be transferred from the public MTA 203-1, to other public MTAs 203, and to the public MTA 203-n. In the example of FIG. 3, the IP address of the public MTA 203-n is also referred to as the "edge IP address" because the public MTA 203-n is the last public MTA that received the email. The private MTA 210, which may also be an email server, receives the email for the private computer network 200. Employing a mail client on the user computer 211, the recipient may subsequently retrieve the email from the private MTA 210.

In the example of FIG. 3, the email inspection system 204 receives emails to and from the private computer network 200 for inspection. The email inspection system 204 may receive an email before the email is received by the private MTA 210, inspect the email for malicious content, and forward the email to the private MTA 210 when the email passes inspection. The email inspection system 204 may hold in quarantine those emails that do not pass inspection. The email inspection system 204 may receive and forward emails that are addressed to computers in the private computer network 200 by proxy, redirection, or any suitable way without detracting from the merits of the present invention.

The email inspection system 204 may employ local or remote resources to inspect the email for malicious content by pattern matching (FIG. 3, 261), heuristic analysis using a sandbox (FIG. 3, 262), file reputation look up (FIG. 3, 263), URL reputation look up (FIG. 3, 264), machine learning (FIG. 3, 265), and/or other suitable email inspection solutions. A problem with most email inspection solutions is that it may take some time to thoroughly inspect an email, and the effectiveness of the inspection depends on the accuracy and completeness of patterns, reputation database, etc. To complicate matters, some malicious emails, such as so-called "advanced persistent threats", appear to be normal until after a delay or arrival in a specifically-targeted computer. Accordingly, the email inspection system 204 may pass an otherwise malicious email.

In the example of FIG. 3, for each received email 251, the email inspection system 204 records the following security information 252 of the email 251 in a database 250: Mail Sender, Mail Recipient, Mail Time, Mail Subject, Mail attachment SHA1 and/or URL, Source IP (first public MTA IP), Edge IP (last public MTA IP), and Inspection Result. The Mail Sender, Mail Recipient, Mail Time, and Mail Subject may indicate the email address of the sender, the email address of the recipient, the time the email was received at the email inspection system 204, and subject field, respectively, of the email 251. The Mail Attachment SHA1 indicates a hash or other unique coded representation of a file attached to the email, and the Mail URL indicates one or more URLs included in the email (e.g., URLs in the body and/or attachment of the email). The Mail Sender, Mail Recipient, Mail time, Mail Subject, and Mail Attachment SHA1 and/or URL information allows for ease of tracking who received what email to facilitate retrieval of the email if the email is subsequently found to be malicious.

The Source IP indicates the IP address of the first public MTA (MTA 203-1 in the example of FIG. 3) that received the email and the Edge IP indicates the IP address of the last public MTA (MTA 203-n in the example of FIG. 3) that received the email. The Inspection Result indicates whether the email has been found to be normal or malicious. The Source IP and Edge IP information allow the path of the mail to be retraced if the email is subsequently found to be malicious, which is useful in identifying public MTAs that frequently forward malicious emails, including those that send advanced persistent threat emails.

Figure 4:
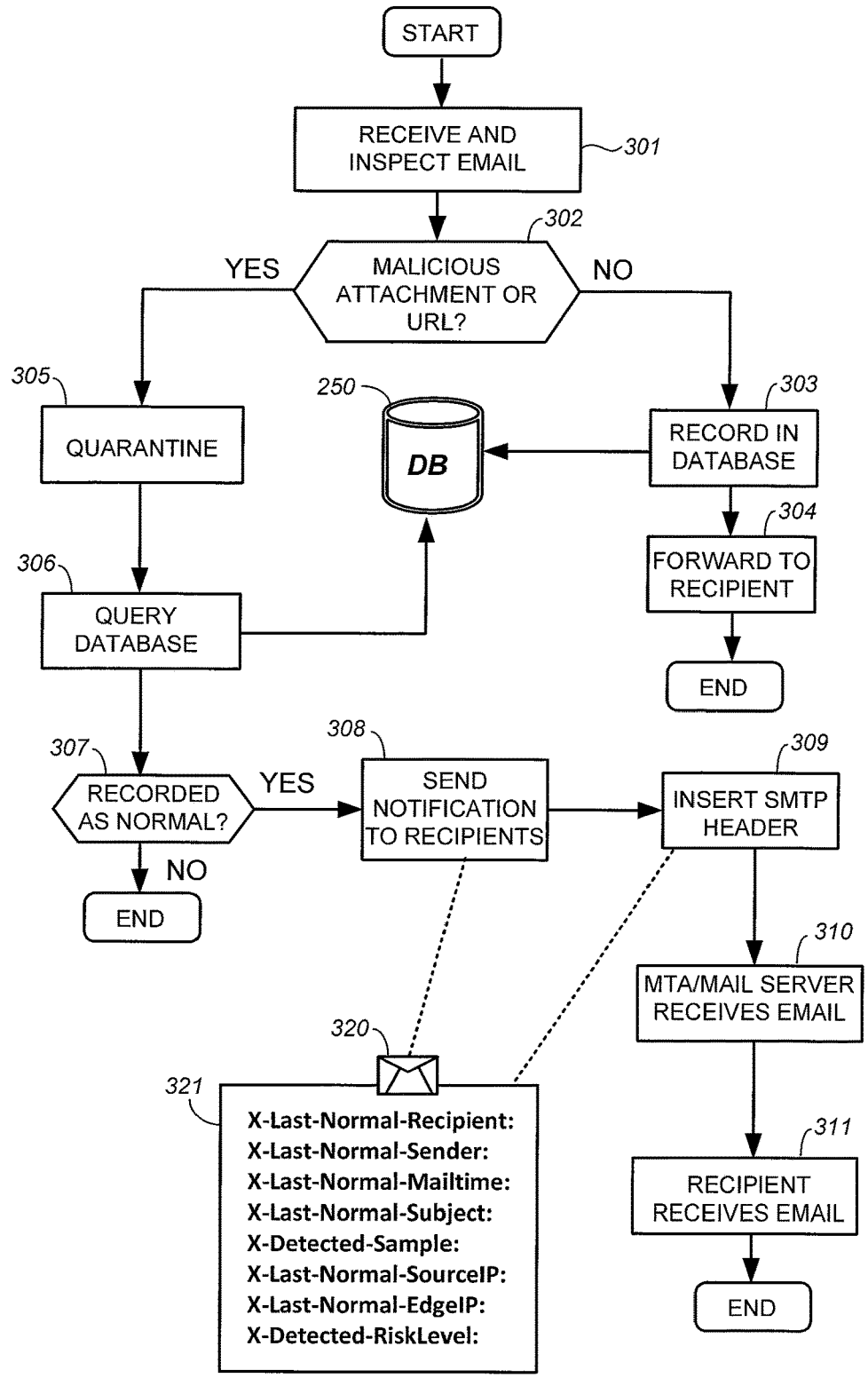
FIG. 4 shows a flow diagram of a method of inspecting an email in accordance with an embodiment of the present invention.

FIG. 4 shows a flow diagram of a method of inspecting an email for malicious content in accordance with an embodiment of the present invention. The method of FIG. 4 is explained using the components of the system shown in FIGS. 2 and 3 for illustration purposes. The method of FIG. 4 may be performed for each email received by the email inspection system 204 for inspection.

A means for recording security information of a first email may include a processor of the email inspection system 204 executing instructions to perform step 303 of the method of FIG. 4 to record a security information 252 of a received email 251 in a database 250 as shown in FIG. 3. A means for detecting that a second email has a malicious content that is also present in the first email may include the processor of the email inspection system 204 executing instructions to perform the steps 302, 306, and 307 of the method of FIG. 4. A means for notifying a recipient of the first email that the first email includes malicious content may include the processor of the email inspection system 204 executing instructions to perform the steps 308 and 309 of the method of FIG. 4. A means for receiving the notification may include a processor of the private MTA 210 executing instructions to perform the step 310 of the method of FIG. 4.

In the example of FIG. 4, the email inspection system 204 receives and inspects an email (step 301) that is sent from an email address of the sender who employs the user computer 202 and addressed to an email address of the recipient who employs the user computer 211. The email inspection system 204 inspects the email for malicious content. For example, the email inspection system 204 may scan one or more files attached to the email for computer viruses, and scan the body of the email for malicious URLs (step 302). When the email passes inspection, e.g., has no malicious files or URLs, the email inspection system 204 deems the email to be normal and records the email, along with its security information (e.g., FIG. 3, 252), in the database 250 (step 302 to step 303). The email inspection system 204 may thereafter forward the email to the recipient (step 304).

The email is quarantined by the email inspection system 204 when the email fails inspection (step 302 to step 305), such as when the email has a malicious attachment (e.g., virus-infected file) or malicious URL. As can be appreciated, the email inspection system 204 may perform other responsive actions against emails that fail inspection.

When the email fails inspection, the email inspection system 204 queries the database 250 for the same malicious attachment (e.g., based on the SHA1 hash) or malicious URL included in previously received emails that were recorded in the database 250 as normal, i.e., passed inspection (step 305 to step 306). If the database 250 indicates that one or more previously received normal emails have the same malicious attachment or malicious URL (step 307 to step 308), the email inspection system 204 sends a notification to each recipient of the previously received normal emails (step 308), which are referred to herein as "compromised emails." For purposes of the present disclosure, a compromised email is an email that has been deemed normal but is subsequently detected to be malicious. The notification may indicate to the recipient of a compromised email that he or she has received an email with malicious content.

In one embodiment, the notification is a notification email 320, and the email inspection system 204 inserts SMTP notification headers (FIG. 4, 321) in the notification email 320 (step 309). In the example of FIG. 4, the SMTP notification headers include: X-Last-Normal-Recipient, X-Last-Normal-Sender, X-Last-Normal-Mailtime, X-Last-Normal-Subject, X-Detected-Sample, X-Last-Normal-SourceIP, X-Last-Normal-EdgeIP, and X-Detected-RiskLevel. The email inspection system 204 may indicate the risk level posed by the malicious URL or malicious attachment in the X-Detected-RiskLevel notification header. Information for the other notification headers may to be taken from the security information of the compromised emails recorded in the database 250.

The X-Last-Normal-Recipient, X-Last-Normal-Sender, X-Last-Normal-Mailtime, and X-Last-Normal-Subject notification headers may be taken from the Mail Sender, Mail Recipient, Mail Time, and Mail Subject security information, respectively, of the compromised email. These notification headers allow a mail server, such as that of the computer hosting the private MTA 210, to readily identify and delete (or perform other responsive action against) the compromised email. This is particularly advantageous in cases where the compromised email has yet to be downloaded by the recipient. A response action against a compromised email may be based on the risk level posed by the compromised email as indicated in the X-Detected-RiskLevel notification header.

The X-Detected-Sample notification header is the malicious ULR or the hash of the malicious attachment, and may also be taken from the Mail Attachment security information of the compromised email. The X-Detected-Sample notification header allows the private MTA 210 or other computer to identify and block incoming emails with the same malicious attachment or malicious URL. The X-Detected-Sample notification header also allows other security computers to inspect other emails for the same attachment or malicious URL.

The X-Last-Normal-SourceIP and X-Last-Normal-EdgeIP notification headers may be taken from the Source IP and Edge IP security information of the compromised email. The X-Last-Normal-SourceIP and X-Last-Normal-EdgeIP notification headers allow the private MTA 210 or other computer to identify public MTAs that always send malicious emails. Because some malicious public MTAs do not perform malicious actions at all times, these malicious public MTAs may otherwise be difficult to detect. The private MTA 210 may block emails coming from public MTAs that have forwarded a threshold number of malicious emails.

The email inspection system 204 forwards the notification email 320 to the recipient in the private computer network 200. In the example of FIG. 4, the notification email 320 is received by the private MTA 210 (step 310). The private MTA 210 identifies the compromised emails from the SMTP notification headers 321 of the notification email 320, and performs a response action against the compromised emails. For example, the private MTA 210 may delete compromised emails that are still on the private MTA 210. The private MTA 210 forwards the notification email 220 to recipients of the compromised emails (step 311). This advantageously allows the recipients of the compromised emails to delete or perform other response action against the compromised email. In situations where the recipient of a compromised email has forwarded the email to other users, the recipient may forward the notification email to those users so they can also delete or perform other response action against the compromised email.

Systems and methods for inspecting emails for malicious content have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
   receiving a first email;
   inspecting the first email for malicious content;
   in response to not detecting malicious content in the first email, recording security information of the first email, the security information comprising an indication that the first email has passed the inspection for malicious content, an address of a recipient of the first email, and an identifier of a content of the first email;
   after the first email has passed the inspection for malicious content, forwarding the first email to the recipient of the first email;
   receiving a second email after receiving the first email;
   inspecting the second email for malicious content;
   detecting that the second email has malicious content;
   from the recorded security information of the first email, identifying the first email as having previously passed inspection for malicious content but has a same malicious content as the second email; and
   after the first email has been forwarded to the recipient and in response to detecting that the first email has the same malicious content as the second email, sending out over a computer network a notification email to the recipient that the first email is a malicious email.

2. The computer-implemented method of claim 1, wherein the first email has been forwarded through a plurality of public Mail Transfer Agents (MTAs), and wherein sending the notification email to the recipient comprises inserting a first Simple Mail Transfer Protocol (SMTP) header in the notification email, the first SMTP header identifying a first public MTA that first received the first email on the Internet.

3. The computer-implemented method of claim 2, wherein sending the notification email to the recipient comprises inserting a second SMTP header in the notification email, the second SMTP header identifying a last public MTA that last received the first email on the Internet.

4. The computer-implemented method of claim 1, wherein sending the notification email to the recipient comprises inserting a third Simple Mail Transfer Protocol (SMTP) header in the notification email, the third SMTP header identifying a malicious content in the first email.

5. The computer-implemented method of claim 4, wherein the malicious content in the first email comprises a malicious file attachment and the third SMTP header indicates a hash of the malicious file attachment.

6. The computer-implemented method of claim 4, wherein the malicious content in the first email comprises a malicious Uniform Resource Locator (URL) and the third SMTP header indicates the malicious URL.

7. The computer-implemented method of claim 1, wherein the first email and the second email are received for inspection for malicious content over the Internet, and the first email is forwarded to the recipient in a private computer network.

8. The computer-implemented method of claim 1, wherein the first email has been forwarded through a plurality of public Mail Transfer Agents (MTAs), and wherein recording the security information of the first email comprises:
  recording in a database an Internet Protocol (IP) IP address of a first public MTA that first received the first email on the Internet; and
  recording in the database an IP address of a last public MTA that last received the first email on the Internet.

9. The computer-implemented method of claim 8, wherein the notification email includes a Simple Mail Transfer Protocol (SMTP) header that indicates the IP address of the first public MTA and another SMTP header that indicates the IP address of the last public MTA.

10. The computer-implemented method of claim 9, further comprising:
  after sending the notification email to the recipient, blocking the IP address of the first public MTA.

11. A system for inspecting emails for malicious content, the system comprising:
  a first computer comprising a processor and a memory, the memory of the first computer including instructions that when executed by the processor of the first computer cause the first computer to perform the steps of:
  receiving a first email;
  inspecting the first email for malicious content;
  in response to not detecting malicious content in the first email, recording security information of the first email, the security information comprising an indication that the first email has passed the inspection for malicious content, an address of a recipient of the first email, and an identifier of a content of the first email;
  after the first email has passed the inspection for malicious content, forwarding the first email to the recipient of the first email;
  receiving a second email after receiving the first email;
  inspecting the second email for malicious content;
  detecting that the second email has malicious content;
  from the recorded security information of the first email, identifying the first email as having previously passed inspection for malicious content but has a same malicious content as the second email; and
  after the first email has been forwarded to the recipient and in response to detecting that the first email has the same malicious constant as the second email, sending out over a computer network a notification email to the recipient that the first email is a malicious email.

12. The system of claim 11, further comprising:
  a second computer comprising a processor and a memory, the memory of the second computer including instructions that when executed by the processor of the second computer cause the second computer to perform the steps of:
  receiving the notification email in a private computer network; and
  forwarding the notification email to a user computer of the recipient in the private computer network.

13. The system of claim 12, wherein the first email has been forwarded through a plurality of public Mail Transfer Agents (MTAs), and wherein the instructions in the memory of the second computer, when executed by the processor of the second computer, cause the second computer to perform the steps of:
  identifying, from a first Simple Mail Transfer Protocol (SMTP) header of the notification email, an Internet Protocol (IP) address of a first public MTA that first received the first email on the Internet; and
  blocking emails forwarded from the first public MTA.

14. The system of claim 12, wherein the first email has been forwarded through a plurality of public Mail Transfer Agents (MTAs), and wherein the instructions in the memory of the second computer, when executed by the processor of the second computer, cause the second computer to perform the steps of:
  identifying, from a second Simple Mail Transfer Protocol (SMTP) header of the notification email, an Internet Protocol (IP) address of a last public MTA that last received the first email on the Internet; and
  blocking emails forwarded from the last public MTA.

\* \* \* \* \*